T861035

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 15, 1969

861 O.G. 705

775,574

PLASTICIZED TOBACCO SMOKE FILTER

George P. Touey and Cephas H. Sloan, both of P.O. Box 511, Kingsport, Tenn. 37662

Continuation of abandoned application Ser. No. 659,024, Aug. 8, 1967. This application Oct. 14, 1968. Published Apr. 15, 1969

Class 131—267

No Drawing. 15 Pages Specification

A tobacco smoke filter containing a rapid bonding plasticizer blend of glyceryl triacetate and a glycol ether wherein the glyceryl triacetate content ranges from 99% to 80% and the glycol ether is selected from the group consisting of di-, tri-, and tetraethylene glycol.